F. LAMBERT.
METER.
APPLICATION FILED MAR. 13, 1915.

1,155,665.

Patented Oct. 5, 1915.
2 SHEETS—SHEET 1.

Witnesses:
J. J. Massey
Paul H. Franke

Inventor
Frank Lambert

By his Attorneys

F. LAMBERT.
METER.
APPLICATION FILED MAR. 13, 1915.
1,155,665.
Patented Oct. 5, 1915.
2 SHEETS—SHEET 2.
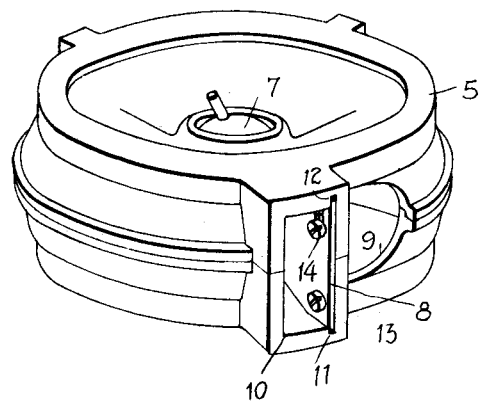
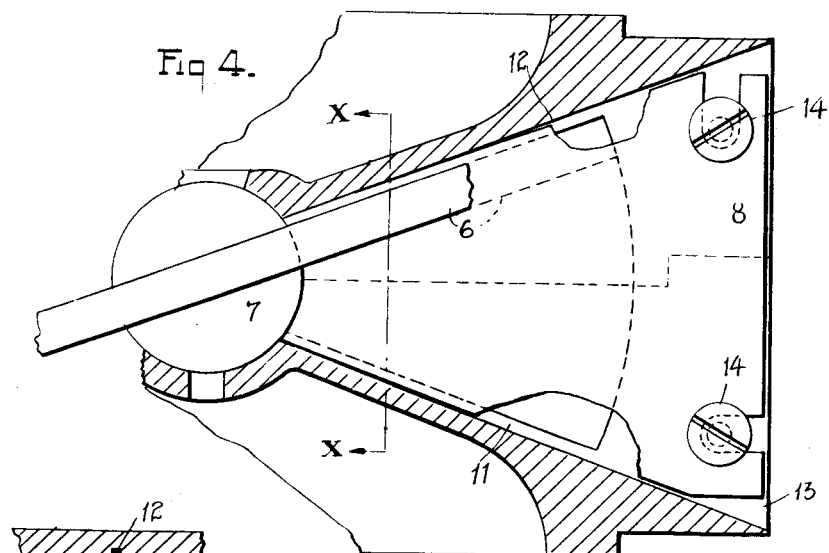
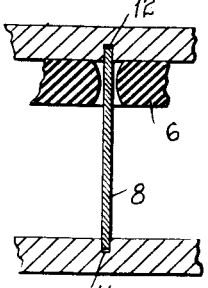
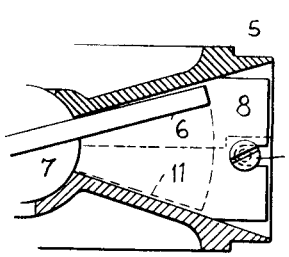
Witnesses:
Inventor
Frank Lambert
By his Attorneys

UNITED STATES PATENT OFFICE.

FRANK LAMBERT, OF NEW YORK, N. Y.

METER.

1,155,665.  Specification of Letters Patent.  Patented Oct. 5, 1915.

Application filed March 13, 1915. Serial No. 14,266.

*To all whom it may concern:*

Be it known that I, FRANK LAMBERT, a citizen of the United States of America, and a resident of the borough of Brooklyn, county of Kings, city and State of New York, have invented certain new and useful Improvements in Meters, of which the following is a specification.

My invention relates to improvements in meters, particularly meters of the nutating disk type. Such meters comprise a so-called measuring chamber having inlet and outlet ports and having within it a disk piston having a spherically-shaped bearing member at its center, on which bearing member the disk rocks or nutates with a progressive wave-like motion, under the influence of the fluid passing through the meter, but without rotating; and by such motion the disk piston drives suitable registering mechanism. The measuring chamber is provided with a partition, termed in the art a diaphragm, extending from the periphery of the measuring chamber, at a point between the inlet and outlet ports, to the said spherical bearing member of the piston, the piston being slotted to embrace this partition or diaphragm. In such meters, the adjustment of the said diaphragm in the chamber, and with respect to the central bearing member of the piston, has been a difficult operation; it is important that the diaphragm shall have a very close fit with respect to said bearing member, and yet it must not bind on the bearing member, so as to interfere with free motion of the piston; for if the diaphragm fit the said bearing member too loosely, there will be leakage; while if it fit too snugly the meter will be sluggish in action and will not register at low rates of flow.

My invention consists in a construction wherein the said diaphragm may be adjusted in position radially and thereby fitted accurately to the said bearing member, and in case of wear is easily refitted.

The object of my invention is to facilitate fitting and adjustment in case of wear of the diaphragms of disk meters to the piston bearing members, and thereby to avoid leakage, on the one hand, and sluggish action of the meter, on the other hand.

I will now proceed to describe my invention with reference to the accompanying drawings, and will then point out the novel features in claims.

Figure 1:
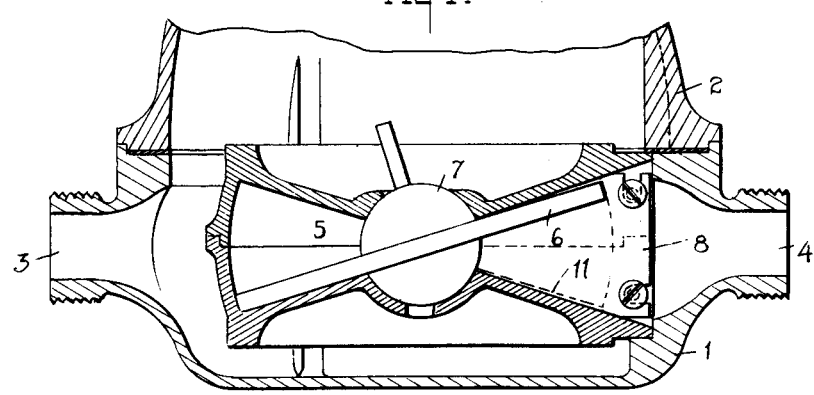
Figure 2:
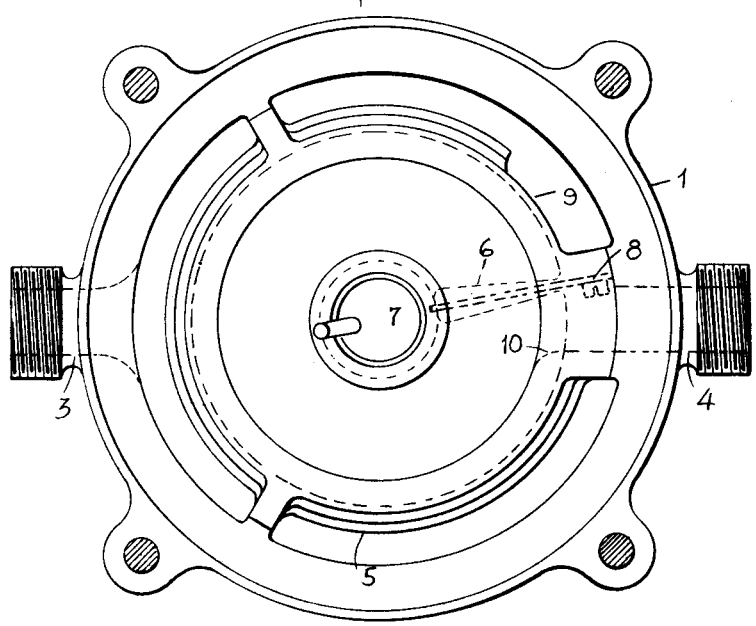

In said drawings: Figure 1 shows a fragmentary vertical section through the casing of the meter such as referred to, and through the flow chamber of the meter. Fig. 2 shows a top view of the flow chamber and lower casing section of the meter, the upper section of the casing having been removed. Fig. 3 is a perspective elevation of the measuring chamber, removed from the casing, and in particular shows the inlet and outlet ports of the measuring chamber and the means for the adjustment of the diaphragms. Fig. 4 is a detail axial section on a larger scale than the preceding views, showing the diaphragm and associated parts. Fig. 5 shows a fragmentary transverse section on the line $x$—$x$ of Fig. 4, and in particular, shows the mounting of the diaphragm in grooves in the walls of the measuring chamber. Fig. 6 is a detail view showing one screw only for holding the diaphragm in place.

In the drawings, 1 designates the lower section of the casing of the meter, 2 the upper section thereof, 3 the inlet port of the casing, 4 the outlet port, 5 the measuring chamber (formed in two sections as shown), 6 the disk piston and 7 the spherical bearing member of the disk piston mounted in a spherical socket formed in the two sections of the measuring chamber, as shown.

8 designates the said diaphragm, 9 the inlet port of the measuring chamber, and 10 the outlet port of that chamber. As usual, the measuring chamber has, internally, a flaring form, and the diaphragm 8 is of corresponding tapering form. According to my invention, the upper and lower walls of the measuring chamber are provided with grooves, 11 and 12 (Fig. 5), in which the diaphragm fits closely. The diaphragm is held in place by one or more screws 14 (two, in the construction shown) entering corresponding screw holes in the wall 13 of the measuring chamber intervening between the inlet and outlet ports of that measuring chamber, said screws passing through apertures in the diaphragm of slightly greater breadth than the shanks of said screws, thus providing, between the walls of said apertures, and the shanks of said screws, a slight play permitting slight radial adjustment of the diaphragm. Except for the fact that the width of the diaphragm is slightly less than the distance between the bottoms of the grooves in which that diaphragm fits, this radial adjustment would not be possible, but because of the slight play between the edges of the diaphragm and the bottoms of said grooves, said radial adjustment is possible.

The inner circular face of the diaphragm is machined carefully, to fit accurately the bearing member 7 of the piston. It will be seen that, with the piston in place, it is a simple matter to adjust the diaphragm to have just the proper fit with respect to that bearing member 7, and then, by tightening the screws 14 the diaphragm is secured at such adjustment.

The screw apertures in the diaphragm, are preferably slots, as shown in Fig. 4. The upper slot permits a certain amount of separation of the two sections of the measuring chamber, such as may be required to relieve excessive pressure in the chamber due to freezing of the contents of the chamber, etc., and also permits removal or replacement of the upper section of the measuring chamber and the removal of the diaphragm without removal of the screws holding the diaphragm in place.

In small meters one screw can be dispensed with, for as shown in Fig. 6, one screw will be enough to hold the diaphragm in position.

It is obviously immaterial in a broad sense to which face of the post separating the inlet and outlet ports the diaphragm is secured. In the drawing I have shown such diaphragm secured to the outlet side of the said post, a construction which has some specific advantages.

What I claim is:

1. In a fluid meter, the combination with a measuring chamber and a nutating piston therein having a ball center, said chamber having inlet and outlet ports, of a diaphragm within said chamber separating said ports, and engaging the ball center of the piston, said diaphragm mounted to be adjusted radially, and means for holding said diaphragm in place in various positions to which it may be adjusted.

2. In a fluid meter, the combination with a measuring chamber and a nutating piston therein having a ball center, said chamber having inlet and outlet ports and having walls which flare radially outward, such walls of said chamber having in them grooves, of a diaphragm within said chamber separating said ports and engaging the ball center of the piston, and having its edges located within said grooves and fitting closely therein, said diaphragm mounted to be adjusted radially, and means for holding said diaphragm in place in various positions to which it may be adjusted.

3. In a fluid meter, the combination with a measuring chamber and a nutating piston therein having a ball center, said chamber having inlet and outlet ports and having walls which flare radially outward, such walls of said chamber having in them grooves, of a diaphragm within said chamber separating said ports, and engaging the ball center of the piston, and having its edges located within said grooves and fitting closely therein, said diaphragm mounted to be adjusted radially, and means for holding said diaphragm in place in various positions to which it may be adjusted, there being clearance between the edges of said diaphragm and the bottoms of said grooves to permit such radial adjustment.

4. In a fluid meter, the combination with a measuring chamber and a nutating piston therein having a ball center, said chamber having inlet and outlet ports, and having a wall separating said ports, of a diaphragm within said chamber, separating said ports, and engaging the ball center of the piston, said diaphragm mounted in grooves of radial walls of the chamber and secured to that wall of the chamber which separates the inlet and outlet ports, said diaphragm being adjustable radially.

In testimony whereof I have signed this specification in the presence of two subscribing witnesses.

FRANK LAMBERT.

Witnesses:
H. M. MARBLE,
D. A. DAVIES.